United States Patent
Lepretre et al.

(10) Patent No.: US 6,634,593 B2
(45) Date of Patent: Oct. 21, 2003

(54) REMOTE CONTROLLED AIRCRAFT, IN PARTICULAR FOR SURVEILLANCE OR INSPECTION

(75) Inventors: Marc Lepretre, Bois Colombes (FR); Georges Chastang, Coignieres (FR)

(73) Assignee: Bertin Technologies, Paris (FR)

( * ) Notice: Subject to any disclaimer, the term of this patent is extended or adjusted under 35 U.S.C. 154(b) by 16 days.

(21) Appl. No.: 10/218,885

(22) Filed: Aug. 14, 2002

(65) Prior Publication Data

US 2003/0025032 A1 Feb. 6, 2003

Related U.S. Application Data

(63) Continuation of application No. PCT/FR01/00405, filed on Feb. 13, 2001.

(30) Foreign Application Priority Data

Feb. 15, 2000 (FR) .............................................. 00 01923

(51) Int. Cl.[7] .............................................. B64C 27/20
(52) U.S. Cl. ........................ 244/7 B; 244/93; 244/189
(58) Field of Search ............................... 244/1 TD, 4 R, 244/7 B, 12.2, 17.11, 17.17, 189, 190, 80, 92, 93, 75 A; 416/50–53

(56) References Cited

U.S. PATENT DOCUMENTS

| | | | | |
|---|---|---|---|---|
| 2,495,565 A | * | 1/1950 | Baker ........................ | 416/52 |
| 3,149,803 A | * | 9/1964 | Petrides et al. .......... | 244/17.13 |
| 3,217,097 A | | 11/1965 | Pauli et al. | |
| 3,223,358 A | * | 12/1965 | Quick ...................... | 244/17.17 |
| 3,226,059 A | * | 12/1965 | Paterson et al. ......... | 244/17.17 |
| 3,314,628 A | * | 4/1967 | Myers ..................... | 244/17.17 |
| 3,611,367 A | * | 10/1971 | Billottet et al. ............... | 342/58 |
| 3,983,636 A | * | 10/1976 | Fashbaugh et al. ........... | 33/346 |
| 4,058,277 A | * | 11/1977 | Kozakiewicz et al. ... | 244/17.17 |
| 4,363,241 A | * | 12/1982 | Egolf .......................... | 73/536 |
| 4,505,346 A | * | 3/1985 | Mueller ...................... | 180/7.4 |
| 4,606,516 A | * | 8/1986 | Willison ..................... | 244/121 |
| 4,645,420 A | * | 2/1987 | Warner .................... | 244/17.17 |
| 5,057,169 A | * | 10/1991 | Adelman ..................... | 156/71 |

FOREIGN PATENT DOCUMENTS

| | | |
|---|---|---|
| EP | 0 279 391 A2 | 8/1988 |
| FR | 2 749 901 A1 | 12/1997 |

* cited by examiner

Primary Examiner—Michael J. Carone
Assistant Examiner—Daniel Matz
(74) Attorney, Agent, or Firm—Alston & Bird LLP

(57) ABSTRACT

The invention concerns a remote-controlled flying machine, in particular for surveillance and inspection, capable of hovering and comprising a spherical open-worked resistant shroud integral with a cylindrical fairing wherein rotates a propeller powered by an engine housed in a fuselage secured to the fairing with radial arms and straightening vanes.

16 Claims, 5 Drawing Sheets

REMOTE CONTROLLED AIRCRAFT, IN PARTICULAR FOR SURVEILLANCE OR INSPECTION

CROSS-REFERENCE TO RELATED APPLICATIONS

This application is a continuation of International Application No. PCT/FR01/00405, filed Feb. 13, 2001.

The invention relates to a remote controlled aircraft or drone in particular for surveillance or inspection, for example of works of art, suspended cables, high voltage power lines, nuclear installations, etc.

Such an aircraft is generally equipped with observation and detection means, in particular a camera for producing images of overflown zones, allowing both visual inspection of the zones and allowing the aircraft to be piloted by sight, and a propeller or rotor with a vertical axis allowing vertical takeoff and hovering.

Mounting the propeller in a cylindrical fairing has already been proposed to slightly reduce the dimensions of the propeller for the same thrust and to reduce the risks of the rotating propeller impinging on surrounding objects or personnel.

The invention aims to substantially improve that type of aircraft to enable it to be used in complete safety and to substantially improve its performance and versatility in service.

The invention also aims to provide such an aircraft that can take off and land substantially vertically, move in forward flight and hover.

To this end, the invention provides a remote controlled aircraft provided with observation and/or detection means, a propeller with a vertical axis rotating inside a substantially cylindrical fairing and an engine powering the propeller, characterized in that the centre of gravity of the aircraft is located below its geometrical centre and in that the assembly comprising the detection and/or observation means, the engine and the propeller is surrounded by a substantially spherical open-worked outer cage that is integral with the fairing.

By dint of these characteristics, the aircraft of the invention can take up a stable position on the ground in which the axis of the propeller is substantially vertical. It can take off vertically, land on the ground and automatically adopt its stable position, and take off again vertically. Further, in the event of a shock to the aircraft against an obstacle, the outer cage protects the aircraft from damage and also protects the obstacle struck by the aircraft.

Advantageously, the outer cage is formed from at least one material that is light and shock resistant.

In one embodiment of the invention, at least a portion of the cage is formed as a single piece with the fairing and is preferably formed from a closed cell plastics material such as a polyethylene foam.

In a variation, said cage is at least partially metallic and comprises a grill or screen fixed or locked into the fairing.

In a further feature of the invention, the aircraft comprises an axial fuselage the aft portion of which contains the engine and the observation and/or detection means, and redressing vanes extending aft of the propeller between the fairing and the axial fuselage to prevent the aircraft from rotating about the axis of the propeller. In a particularly simple embodiment of the invention, said redressing vanes are fixed. In a more sophisticated and expensive embodiment, said redressing vanes can be orientated about an axis perpendicular to the axis of the propeller and are controlled by servo-motors.

In a further characteristic of the invention, said aircraft also comprises control surfaces formed by flaps or ailerons which extend in the aft portion of the aircraft between the fuselage and said cage and which can be orientated about axes perpendicular to the axis of the propeller to direct the aircraft by rotation about its pitch, yaw and/or roll axes.

A control circuit comprises a microprocessor and optionally at least one gyroscope that can determine the appropriate values for the engine speed and for the position of the redressing vanes and/or control surfaces as a function of the commands given by an operator (for example climb or descend, move forward, turn to left or to the right, move backwards).

In a first embodiment, the aircraft is equipped with an electric motor and storage batteries, the latter being located inside the axial fuselage or carried by the fairing.

In a further embodiment, the aircraft is equipped with a heat engine and a fuel tank, the latter being located inside the axial fuselage or carried by the fairing.

The invention also envisages means for dynamic stabilisation of the aircraft in transitional motion, comprising a mobile mass-balance weight mounted as an inverted pendulum on the axis of the propeller forward thereof. Elastically deformable return means and means for dampening the displacement are associated with said mobile weight.

Displacement of said mobile mass-balance weight is phase opposed with any angular drift of the aircraft compared with a desired trajectory and can limit it and slow it sufficiently to correct it manually or automatically.

The stabilisation means can be passive or active. In the latter case, they are associated with servo-motors which can be controlled either by an operator or automatically, for example using an inertial onboard navigation platform or a remote image treatment system, which can obtain references, in particular vertical references, from images transmitted by the observation means of the aircraft.

The aircraft of the invention can have a wide range of dimensions depending on the tasks it is intended to fulfil. Its design enables it to be produced with simple means that are commercially available at a relatively low cost.

The invention will be better understood and other characteristics, details and advantages will become apparent from the following description made with reference to the accompanying drawings in which.

Figure 1:
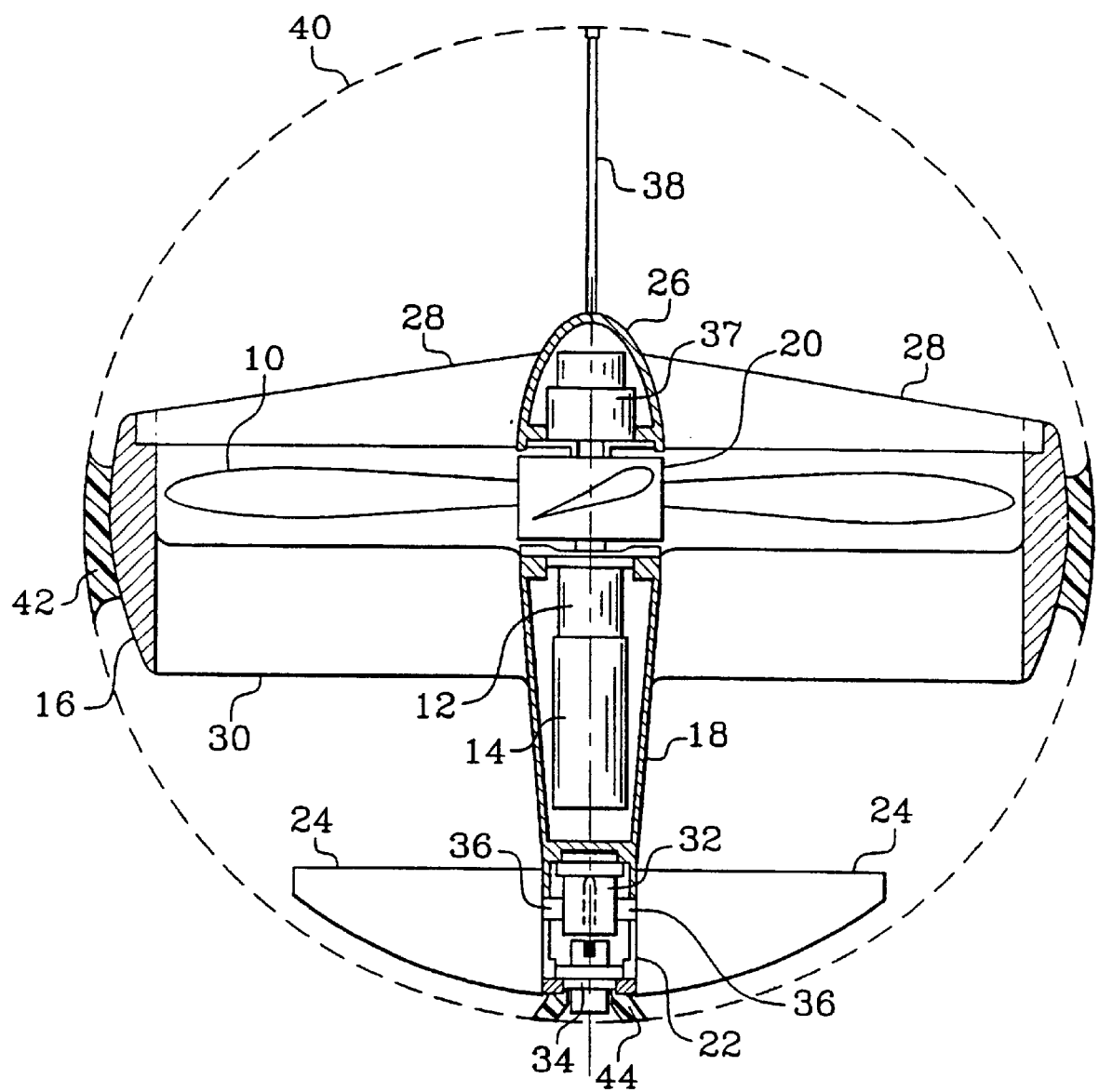
FIG. 1 is a diagrammatic axial cross sectional view of an aircraft in accordance with the invention.

In the embodiment shown in FIG. 1, reference numeral 10 designates a propeller of any type (twin blade, four-blade or the like) driven in rotation by an electric motor 12 advantageously associated with a variable rotation speed drive and powered by storage batteries 14, the propeller rotating inside a cylindrical fairing 16 which is coaxial with the propeller.

Engine 12 and storage batteries 14 are arranged axially inside a fuselage 18 of truncated conical shape which extends from the boss 20 of the propeller to the aft end 22 of the aircraft which is equipped with control surfaces 24.

The fuselage 18 is extended beyond propeller boss 20 by a dome 26 in the form of a half-ellipsoid connected to fairing 16 via radial arms 28 extending in front of the propeller. Redressing vanes 30 extend radially aft of propeller 10 and connect fairing 16 and fuselage 18; propeller 10 can turn freely between the arms 28 and redressing vanes 30.

The rear portion 22 of the fuselage is used to house servo control circuits 32 for the engine 12, the control surfaces 24 and optionally the redressing vanes, as will be described in detail below, and also houses observation and detection means 34 comprising, for example, at least one video camera, a microphone and one or more sensors of a variety of types.

Control surfaces 24 in this embodiment are formed by four flaps distributed at 90° with respect to each other about the axis of the propeller and pivotally mounted on portion 22 of the fuselage about axes 36 that are perpendicular to the axis of the propeller.

Similarly, redressing vanes 30 can be pivotally mounted about an axis perpendicular to the axis of the propeller, their position being adjusted to stabilise the aircraft and prevent it from turning about the propeller axis when the latter is driven in rotation.

In a variation, the redressing vanes are fixed and their inclination is adjusted to suit the nominal rotation speed of the propeller.

The dome 26 contains radio circuits 37 communicating with ground means and comprises an axial antenna 38 for transmitting information supplied by observation and detection means 34 and for receiving control signals sent by an operator on the ground.

A substantial spherical cage 40 completely surrounds the aircraft described above and is fixed to the fairing 16 via studs or an annular strip 42 of elastically deformable plastic foam, rubber or elastomer which can absorb shocks and vibrations.

This spherical cage 40 is connected to the lower portion 22 of the fuselage via a ring 44 of the material described above, mounted around the observation and detection means 34 to protect them from shocks.

Cage 40 is substantially open-worked and is formed, for example, by a grid or screen of light metal that is shock resistant, which can advantageously be connected to axial antenna 38 and itself form an antenna.

In this assembly, the centre of gravity of the aircraft is below the geometrical centre and above the centre of aerodynamic thrust of the aircraft, so that it can take up a stable position on the ground corresponding to that shown in FIG. 1, the axis of the propeller being vertical.

This aircraft can be used as follows:

Using a remote control of a commercially available type as used for model aeroplanes, for example, an operator can send piloting orders that are captured by antenna 38 and optionally 40 and transmitted to servo-control circuits 32 to control the power to the propeller from electric motor 12 and regulate its rate of rotation (via the electronic variable drive), optionally regulating the inclination of the redressing vanes 30 to prevent the aircraft from rotating about the propeller axis, and to control displacement of the aircraft in a given direction by means of control surfaces 24 which cause the aircraft to pivot about its pitch, yaw and/or roll axes. Means that will be described in detail below can dynamically stabilise the aircraft by limiting and slowing its transitional movements about its centre of gravity, so that they can be corrected either manually or automatically.

In one embodiment, the servo-control circuits 32 comprise one or more on-board gyroscopes associated with a microprocessor which may or may not be on-board to provide reference positions for the redressing vanes 30 and control surfaces 24.

Using the remote control, the operator can make the aircraft take off vertically when it is on the ground in its position of stable equilibrium corresponding to that of FIG. 1, then the operator can steer the aircraft in any direction to carry out surveillance and inspection operations, for example.

The images recorded by the video cameras or cameras comprising part of the observation and detection means 34 are transmitted to the ground via radio connection circuits 37 and are displayed on a television type screen or on special spectacles to be visible to the operator who can then pilot the aircraft by sight as though the operator were in the aircraft. As an example, type PLM-A35 or PLM-S700 spectacles sold by SONY could be used, which provide the operator with a panoramic vision from the aircraft. When the operator turns his head, the field of vision on the spectacles turns in the same manner as though the operator were on board the aircraft. Advantageously, the panoramic image is supplied via arrays of photodetecting diodes (line camera). By rotating the aircraft about a vertical axis, keeping within piloting limits, an image is obtained of all or part of the ground to be observed over 360°. The use of a line camera for this purpose is known to the skilled person.

The spherical cage 40 protects the aircraft from any interference with the external environment and also protects this environment from risks of damage by propeller 10. This cage 40 means that the operator can put the aircraft on the ground allowing it to fall either gently or harshly from a relatively low height, then the aircraft can take off again vertically, as the aircraft on the ground is automatically brought into its stable equilibrium position because its centre of gravity is located below its geometrical centre.

In one particular embodiment, the external diameter of cage 40 is 180 to 200 millimeters, the weight of the aircraft is of the order of 350 grams, the diameter of the propeller is 152 millimeters, the electric motor 14 and the storage batteries provide a driving force of the order of 30 watts and a thrust of the order of 4N, the flying range is of the order of 5 minutes and the aircraft can reach an altitude of a few hundred meters.

Clearly, the dimensions of the aircraft can be varied upwardly or downwardly within wide limits, and it is also possible to substantially increase its flying range by replacing the electric motor 12 and storage batteries 14 with a reciprocal or rotary piston engine associated with a fuel tank, giving it a flying range of a few tens of minutes.

As already indicated, observation means 34 can comprise at least one video camera associated with an emitter for transmitting images to the ground. Suitable camera-emitter ensembles are commercially available and weigh of the order of 65 to 70 grams.

Figure 2:
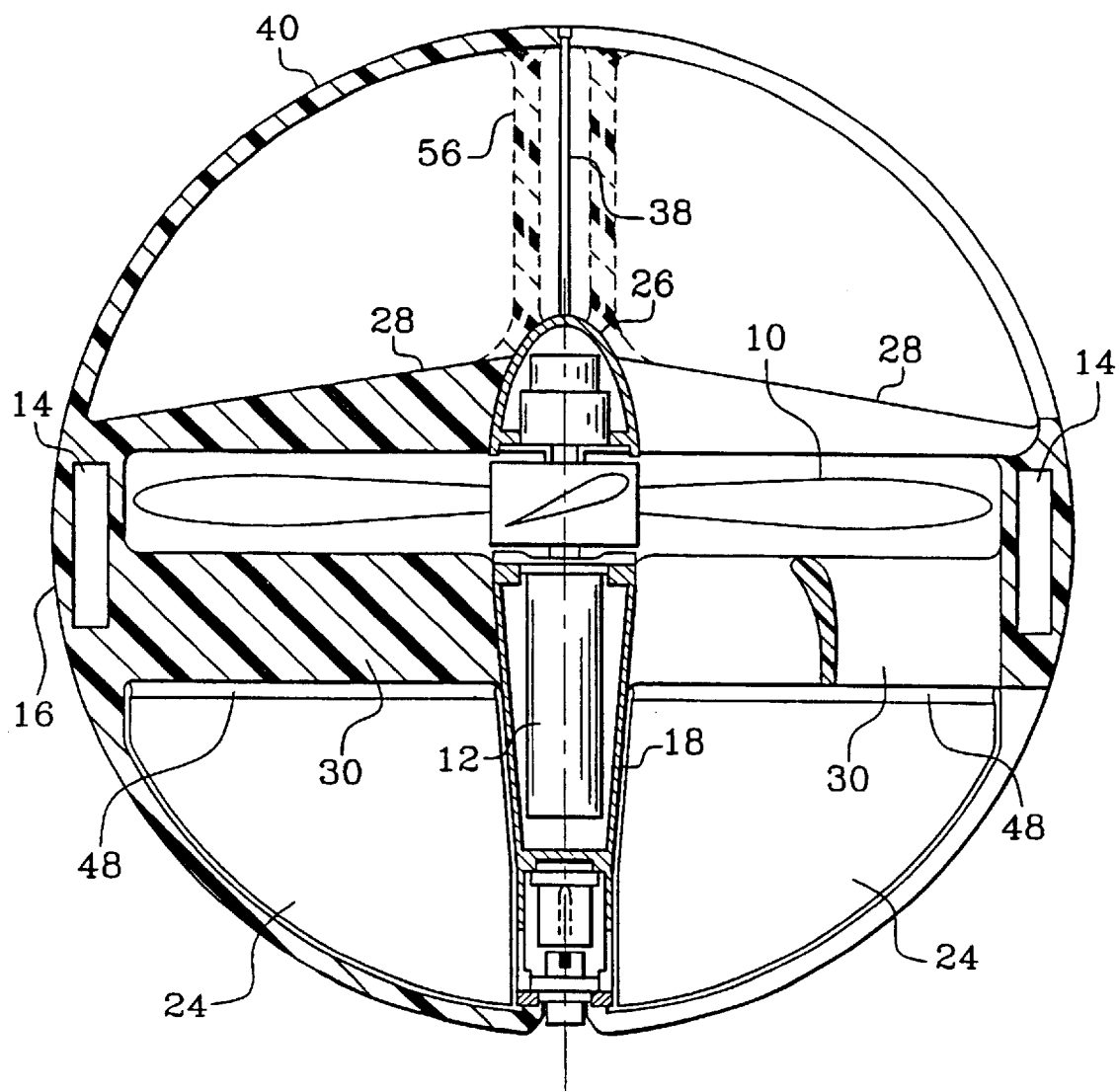
FIG. 2 is a diagrammatic axial cross sectional view of a variation of the aircraft.
Figure 3:
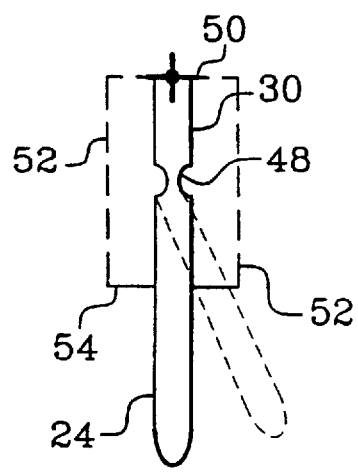
FIG. 3 is a diagrammatic view of means for activating the control surfaces.

In a variation shown diagrammatically in FIGS. 2 and 3, fairing 16, control surfaces 24, connecting arms 28, redressing vanes 30 and outer cage 40 are formed from a closed cell plastics material that is light and shock resistant such as a polyethylene foam with a density of the order of 25 to 35 kilos per cubic meter, or the like.

In this case, cage 40 is not constituted by a screen or grid but by spindles which extend either side of a continuous annular strip forming the fairing 16.

The assembly formed by fairing 16, control surfaces 24, arms 28, redressing vanes 30 and cage 40 is formed by injection moulding two hemispherical portions that are connected together along a joint plane that is perpendicular to the axis of propeller 10 at the fairing 16, as indicated by dotted line 46, for example.

Redressing vanes 30 are fixed and are extended aft by flaps forming control surfaces 24 to which they are connected by flexible hinges formed by local necks 48 as shown diagrammatically in FIG. 3.

Each flap 24 pivots about flexible hinge 48 by means of a servo-motor (not shown) housed inside fairing 16 or fuselage 18 the outlet shaft of which comprises crossed arms 50 connected via lines 52 to a crossbar 54 that is integral with flap 24 and located on the other side of the hinge 48 with respect to arms 50, so that rotation of arms 50 pivots flap 24 about hinge 48, as shown in dotted lines in FIG. 3. These flaps 24 have relatively large dimensions and act as a wing when the aircraft is in forward flight.

In general, it is advantageous to reduce the thickness of arms 28 and redressing vanes 30 in a plane perpendicular to FIGS. 1 and 2 to reduce pressure drops and thus power losses.

Tests have shown that arms 28 with a shape corresponding to that shown in the drawings also act as redressing vanes, complementing the redressing vanes 30, which can be fixed and have a cross section as shown in FIG. 2, to recover a portion of the thrust of the propeller and redress the airflow.

In a variation, arms 28 can be replaced by filamentary elements that form part of cage 40, which can further reduce pressure drops and power losses.

In the embodiment shown in FIG. 2, storage batteries 14 supplying engine 12 are no longer in fuselage 18 but are inside fairing 16 and distributed uniformly about the axis of the aircraft.

As shown in FIG. 2 in dotted lines, the foam plastic material can form an axial tube 56 forward of the propeller between cage 40 and the front portion 26 of the fuselage, and antenna 38 is located inside that tube 56.

Figure 4:
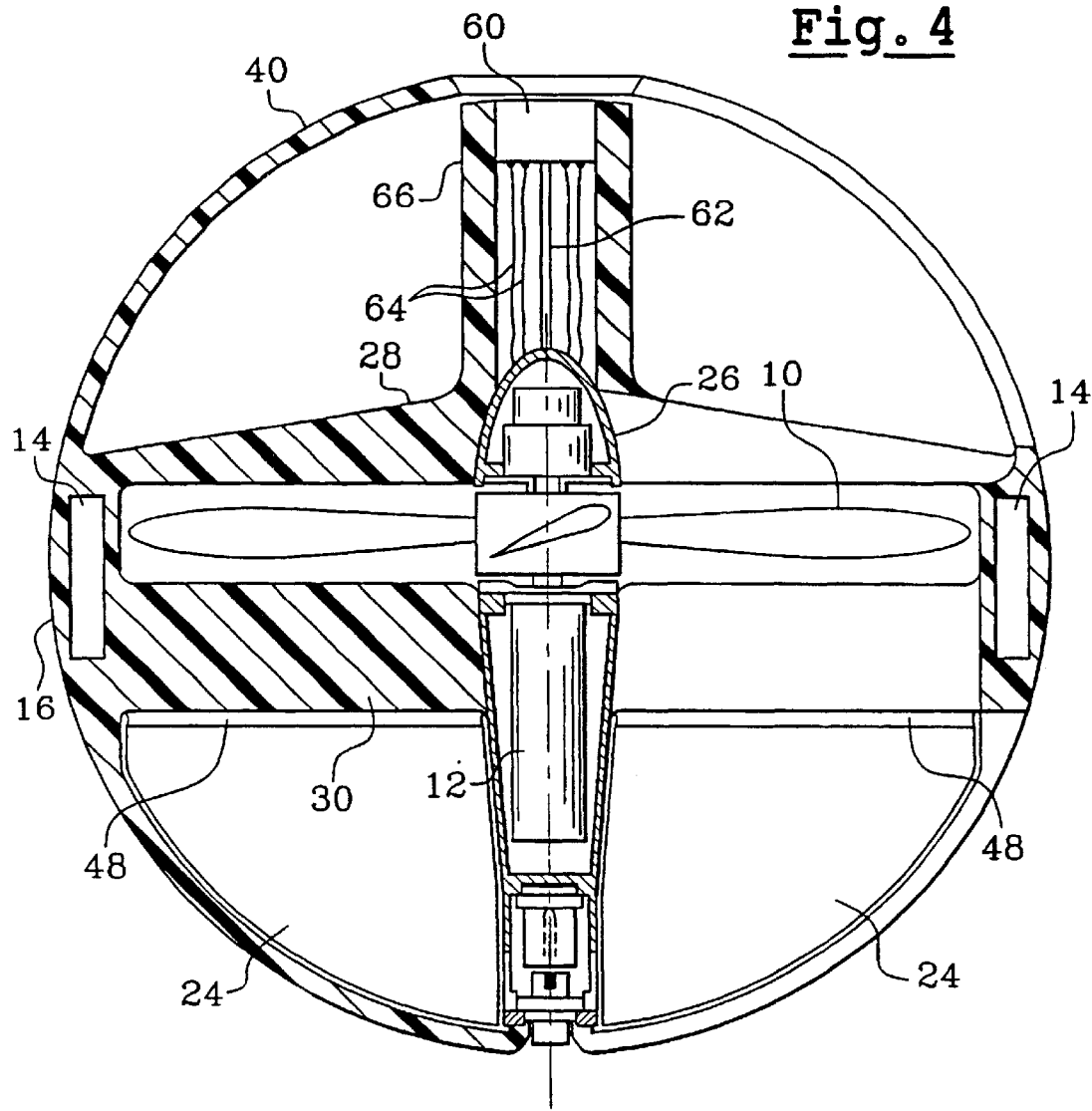
FIGS. 4 to 7 show diagrammatic cross sectional views of variations of the aircraft.

FIG. 4 diagrammatically shows an embodiment of the means cited above for dynamic stabilisation of the aircraft in transitional motion. In this example, which corresponds to the embodiment of FIGS. 2 and 3, a mobile mass-balance weight 60 is mounted as an inverted pendulum on the forward portion of the aircraft in the axis of the propeller and is connected to dome 26 via a rod 62 forming a spring operating as a leaf spring.

In this configuration, the length of bendable rod 62 is selected so that the distance between the point at which it is fixed to dome 26 and the centre of gravity of the mass-balance weight 60 is equal to the distance between that fixing point and the centre of gravity of the aircraft. The value of the mobile weight and the stiffness of the bendable rod are determined so that the oscillations of the mobile weight 60 are synchronous and in phase opposition with those of the aircraft about its centre of gravity.

When an angular drift occurs, which causes the aircraft to pivot about its centre of gravity and which is due to the fact that the thrust passing through the centre of thrust is angularly offset with respect to the axis of the aircraft and no longer passes through the centre of gravity, pivoting the mobile weight 60 with respect to its point of fixing to dome 26 as a result of inertia effects tends to limit and slow the pivoting of the aircraft about its centre of gravity. The angular drift of the aircraft about its centre of gravity is thus sufficiently limited and decelerated for it to be able to be corrected either using the remote control or automatically.

To this end, a number of solutions are possible:
the aircraft can be provided with an inertial navigation platform which will provide set positional values for control surfaces 24 to cancel and compensate for the angular drift of the aircraft about its centre of gravity;
a remote system for treating images can receive images taken by the video camera or cameras in the aircraft, seek out reference points such as horizontal or vertical lines and produce corrective signals which are transmitted to the control surfaces' servo-motors 24.

Displacement dampening means are associated with the mobile weight 60. Advantageously, they are constituted either wholly or partially by a component of the aircraft equipment, for example its radio receiver, so as not to increase the onboard weight. Wires 64 connecting the radio receiver to the dome 26 can form the dampening means mentioned above or can form part thereof.

In a variation, the mobile mass-balance weight 60 can be mounted at the end of an axial tube 66 formed from a deformable elastic material such as the plastics material foam constituting cage 40, fairing 16 and radial arms 28. This tube 66 of deformable elastic material can be integral with the radial arms 28, thus replacing bendable rod 62. The dimensions of tube 66 are determined as a function of the desired bending stiffness of the bendable rod.

Figure 5:
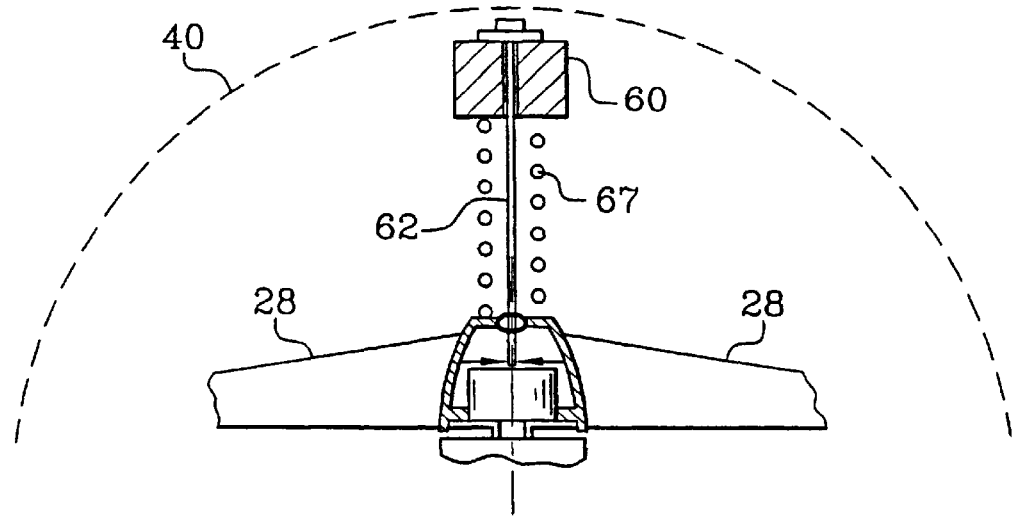

In a further variation shown diagrammatically in FIG. 5, mobile weight 60 is slidably mounted on rod 62 and is supported by a spring 67 which is a compression spring in the example shown and which can vary the length of the inverted pendulum formed by weight 60 and rod 62 in accordance with the law $m.\gamma.l=a$ constant, m being the mass of the mobile equipment, $\gamma$ the applied acceleration and l the length of the pendulum. Spring 67 enables this length to be automatically varied as a function of the thrust and thus to automatically adapt the dynamic stabilisation means to variations in thrust. An adjustable abutment at the end of rod 62 defines the maximum length of the pendulum. Advantageously, rod 60 is mounted on the fairing or on the fuselage by means of a damped pot-type joint and adjusting screws are provided to define an initial position for rod 62 corresponding to placing the centre of gravity of the aircraft on the thrust axis, adjustment being carried out in the workshop on a test rig following assembly of the aircraft to compensate for any imbalance.

In a further embodiment, the means for dynamic stabilisation of the aircraft in transitional motion are active. To this end, servo-motors are associated with support 62 or 66 of the mobile mass-balance weight 60 to provide a desired angular position with respect to the axis of the aircraft. These servo-motors are controlled either by the operator using the remote control, or automatically using an inertial navigation platform or a remote image treatment system, as indicated above.

Figure 6:
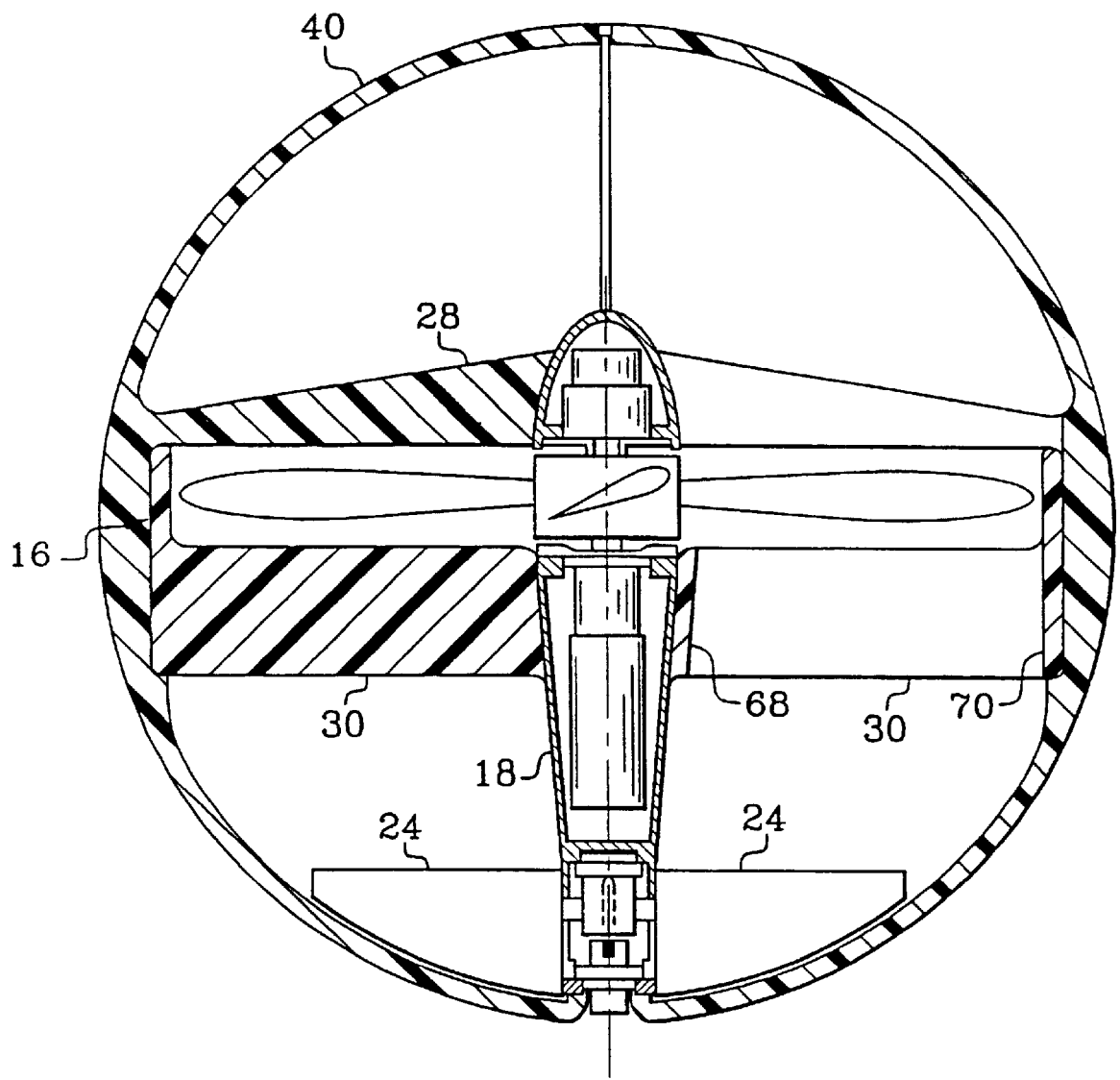

In the variation shown in FIG. 6, fairing 16 is formed from a composite material, for example based on carbon fibres, and comprises two coaxial cylindrical skirts 68 and 70 respectively connected together by redressing vanes 30. Cage 40 can then be formed from two half-shells nested on the fairing 16, the forward half-shell comprising the radial arms 28 defined above.

Figure 7:
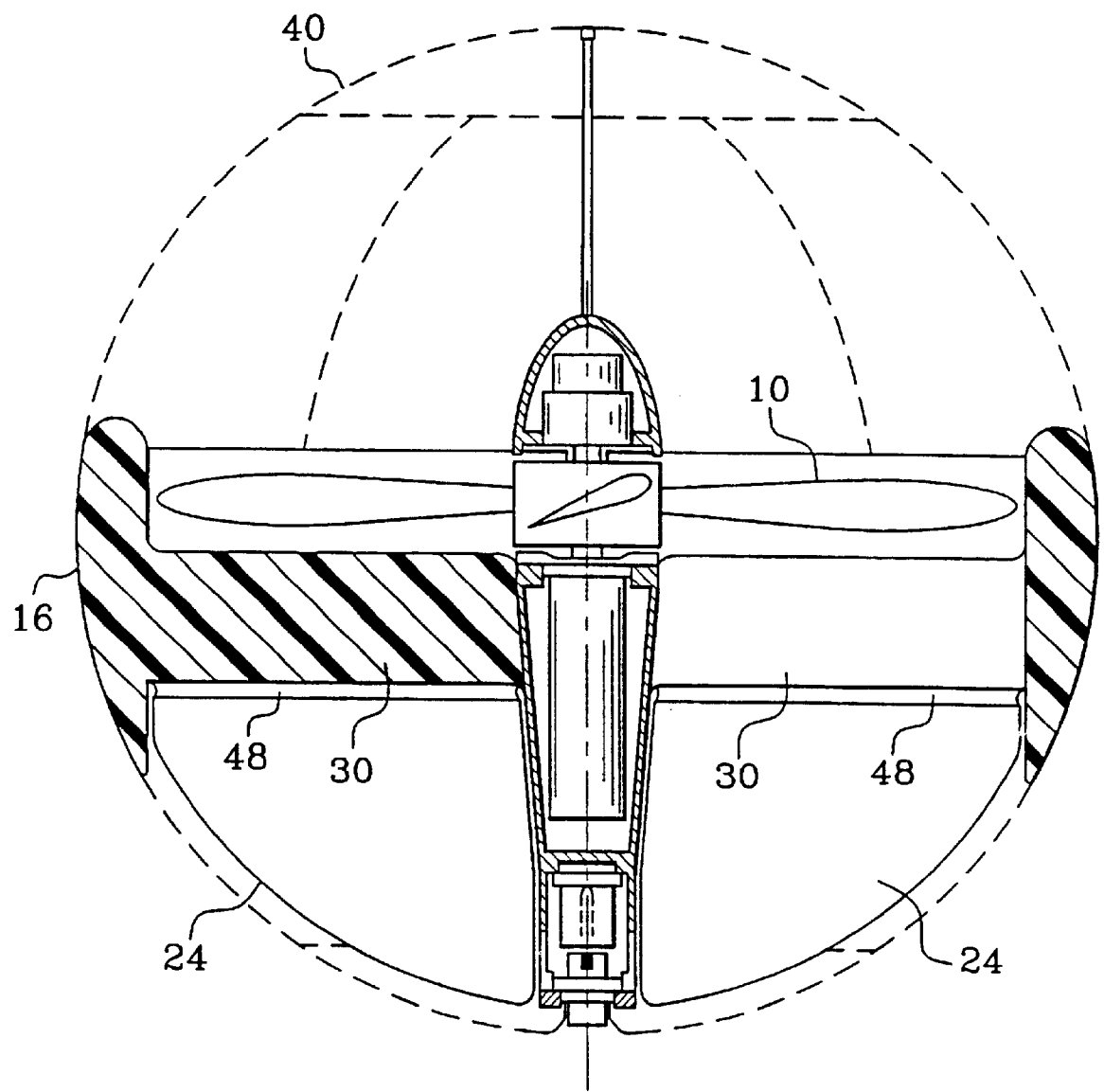

In the embodiment shown in FIG. 7, fairing 16 and redressing vanes 30 are formed from a single piece of foam plastics material, optionally with flaps 24 to which they are connected via flexible hinges 48. Cage 40 is then formed from two substantially hemispherical covers of metal wire shown as dotted lines, and these covers are easily fixed by locking onto fairing 16, the corresponding ends of the metal wires being bent back at right angles to form points that are buried in the material of the fairing 16.

In general, the aircraft of the invention performs completely satisfactorily in the air. When equipped with dynamic stabilisation means as described above, it is possible to use it both for vertical landing and takeoff, for hovering and to put into forward flight. When equipped with an electric motor, it has a relatively short flying range but it is silent, it can be landed at any suitable location and can take off again from that location, under remote control. When equipped with a heat engine, it has a longer range and better performance in the air, but it is harder to land it and make it take off remotely.

What is claimed is:

1. A remote controlled aircraft, for surveillance and inspection, comprising observation and/or detection means, a propeller with a vertical axis rotating inside an approximately cylidrical fairing and an engine powering the propeller, characterized in that the centre of gravity of the aircraft is located below its geometrical centre such that upon landing the aircraft will take a stable position and be prepared for takeoff, and in that the assembly comprising the detection and/or observation means, the engine and the propeller is surrounding by an approximately spherical open-worked cage that is integral with the fairing.

2. An aircraft according to claim 1, characterized in that the case is formed from at least one material that is light and shock resistant.

3. An aircraft according to claim 1, characterized in that at least a portion of the cage is formed as a single piece with the fairing.

4. An aircraft according to claim 1, characterized in that at least a portion of the case is formed from a closed cell plastics material.

5. An aircraft according to claim 1, characterized in that at least a portion of the cage is metallic and comprises a grill or screen.

6. An aircraft according to claim 1, characterized in that it comprises an axial fuselage the aft portion of which contains at least one engine and the observation and/or detection means, and redressing vanes extending aft of the propeller between the fairing and the axial fuselage.

7. An aircraft according to claim 6, characterized in that said redressing vanes are fixed or can be orientated about an axis perpendicular to the axis of the propeller and controlled by servo-motors.

8. An aircraft according to claim 1, characterized in that it comprises control surfaces formed by flaps or ailerons which extend in the lower portion of the aircraft inside said cage and which can be orientated about axes perpendicular to the axis of the propeller to direct the aircraft by rotation about its pitch, yaw and/or roll axes.

9. An aircraft according to claim 6, characterized in that the axial fuselage comprises a forward portion in which radio connection means are housed, and radial arms connecting the forward portion of the fuselage to the fairing forward of the propeller.

10. An aircraft according to claim 6, characterized in that it is equipped with a heat engine and a fuel tank or with an electric motor and storage batteries, the tank or storage batteries being housed in the axial fuselage or carried by the cylindrical fairing.

11. An aircraft according to claim 1, characterized in that it comprises means for dynamic stabilisation of the aircraft in transitional motion comprising, forward of the aircraft, a mobile mass-balance weight mounted as an inverted pendulum on the axis of the propeller, elastically deformable return means for the mobile weight and means for dampening the displacement of said mobile mass.

12. An aircraft according to claim 11, A remote controlled aircraft for surveillance and inspection, comprising observation and/or detection means, a propeller with a vertical axis rotating inside an approximately cylindrical fairing and an engine powering the propeller, wherein the centre of gravity of the aircraft is located below its geometrical centre and wherein the assembly comprising the detection and/or observation means, and wherein the engine and the propeller is surrounded by an approximately spherical open-worked outer cage that is integral with the fairing, and including means for dynamic stabilisation of the aircraft in transitional motion comprising, forward of the aircraft, a mobile mass-balance weight mounted as an inverted pendulum on the axis of the propeller, elastically deformable return means for the mobile weight and means for dampening the displacement of said mobile mass, characterized in that the length of the inverted pendulum varies as a function of the acceleration, the mobile mass being slidably mounted on a bendable rod, example which connects to the aircraft and is supported by a spring regulating the position of the mobile weight on said rod as a function of the acceleration.

13. An aircraft according to claim 11, characterized in that it comprises servo-motors for displacing the mobile weight, controlled by the operator.

14. An aircraft according to claim 11, characterized in that said dynamic stabilization means are automatically controlled by an onboard inertial navigation platform or by a remote image treatment system that can produce references, from images transmitted by the aircraft.

15. An aircraft according to claim 12, characterized in that it comprises servo-motors for displacing the mobile weight, controlled by the operator.

16. An aircraft according to claim 12, characterized in that said dynamic stabilization means are automatically controlled by an onboard inertial navigation platform or by a remote image treatment system that can produce references from images transmitted by the aircraft.

* * * * *

UNITED STATES PATENT AND TRADEMARK OFFICE
CERTIFICATE OF CORRECTION

PATENT NO. : 6,634,593 B2
DATED : October 21, 2003
INVENTOR(S) : Lepretre et al.

It is certified that error appears in the above-identified patent and that said Letters Patent is hereby corrected as shown below:

<u>Column 7,</u>
Line 18, "cylidrical" should read -- cylindrical --;
Line 24, "surrounding" should read -- surrounded --.

<u>Column 8,</u>
Line 16, cancel "An aircraft according to claim 11,";
Line 33, after "rod" cancel the comma (,);
Line 34, cancel "example".

Signed and Sealed this

Second Day of March, 2004

JON W. DUDAS
*Acting Director of the United States Patent and Trademark Office*